United States Patent [19]

Bawks

[11] 4,424,725

[45] Jan. 10, 1984

[54] LOCKING DIFFERENTIAL MECHANISM WITH IMPROVED HOLDOUT RING AND SPRING RETAINER

[75] Inventor: James R. Bawks, St. Clair Shores, Mich.

[73] Assignee: Tractech, Inc., Warren, Mich.

[21] Appl. No.: 188,668

[22] Filed: Sep. 19, 1980

[51] Int. Cl.³ .................................... F16H 35/04
[52] U.S. Cl. .................................... 74/650; 74/711; 192/50
[58] Field of Search .................... 192/50; 74/650, 711

[56] References Cited

U.S. PATENT DOCUMENTS

| | | | |
|---|---|---|---|
| 2,329,059 | 9/1943 | Knoblock | 74/650 |
| 2,638,794 | 5/1953 | Knoblock | 74/650 |
| 2,667,087 | 1/1954 | Myers | 74/650 |
| 2,667,088 | 1/1954 | Myers | 74/650 |
| 2,830,466 | 4/1958 | Myers | 74/650 |
| 3,397,593 | 8/1968 | Knoblock | 74/650 |
| 3,791,238 | 2/1974 | Bokovoy | 74/650 |

*Primary Examiner*—Lawrence J. Staab
*Assistant Examiner*—Joseph M. Rolnicki
*Attorney, Agent, or Firm*—Laubscher, Philpitt & Laubscher

[57] ABSTRACT

An improved differential mechanism of the holdout ring type is disclosed, characterized in that the annular holdout rings are mounted concentrically between the driven clutch members and the associated side gears, respectively, and the springs biasing the driven clutch members toward engagement with the driving spider member arranged therebetween includes a pair of compression springs mounted concentrically between the holdout rings and the side gears, each spring reacting at opposite ends between the associated side gear and annular spring retainer member, respectively. Furthermore, the driven clutch members are each provided with only one set of uniform teeth which cooperate both with driving teeth on the spider member and over-running clutch-disengaging teeth on the center cam member. Consequently, a compact durable positive differential mechanism is provided that is of relatively simple, inexpensive construction requiring a minimum number of parts.

2 Claims, 8 Drawing Figures

LOCKING DIFFERENTIAL MECHANISM WITH IMPROVED HOLDOUT RING AND SPRING RETAINER

BRIEF DESCRIPTION OF THE PRIOR ART

Differential mechanisms of the holdout ring type are well known in the patented prior art, as evidenced by the patents to Knoblock U.S. Pat. Nos. 2,638,794 and 3,397,593, and Bokovoy U.S. Pat. No. 3,791,238, for example. In such differentials, upon the overrunning of one output shaft relative to the other, the driven clutch member associated with the overrunning shaft is disengaged from the driving spider member by center cam means, an associated holdout ring being rotated slightly from an inoperative position to an operative position to maintain the driven clutch member disengaged until the overrunning condition is terminated.

While the known differentials operate generally satisfactorily, they are often large and massive, require a substantial number of operative parts, and, consequently, are relatively costly to manufacture, assemble and service.

SUMMARY OF THE INVENTION

The present invention was developed to provide an improved compact simplified differential mechanism that is of lighter weight, less costly design, is easier to assemble and disassemble, and also which affords positive holdout ring action.

According to a primary object of the invention, in order to obtain compact construction, the holdout rings of the improved differential mechanism are concentrically arranged between the driven clutch members and the side gears, respectively, and the compression biasing springs are concentrically arranged between the holdout rings and the side gears, respectively, whereby the size, weight and cost of the casing may be reduced, together with a reduction in the size and cost of the compression springs.

In accordance with a further object of the invention, each driven clutch member includes only one set of uniform clutch teeth, which teeth include first and second radially aranged portions adapted for meshing engagement with the driven teeth of the annular spider member, and the overrunning clutch-disengaging teeth of the center cam member mounted concentrically within the spider member, respectively. Thus, as distinguished from certain prior art differential constructions wherein the holdout ring is mounted in a groove in the face of the driven clutch member between two sets of teeth that cooperate with the teeth of the spider and center cam members, respectively, the driven clutch member of the present invention is of considerably stronger, less complex and less costly construction.

BRIEF DESCRIPTION OF THE DRAWINGS

Other objects and advantages of the invention will become apparent from a study of the following specification, when viewed in the light of the accompanying drawing, in which.

DETAILED DESCRIPTION

Figure 1:
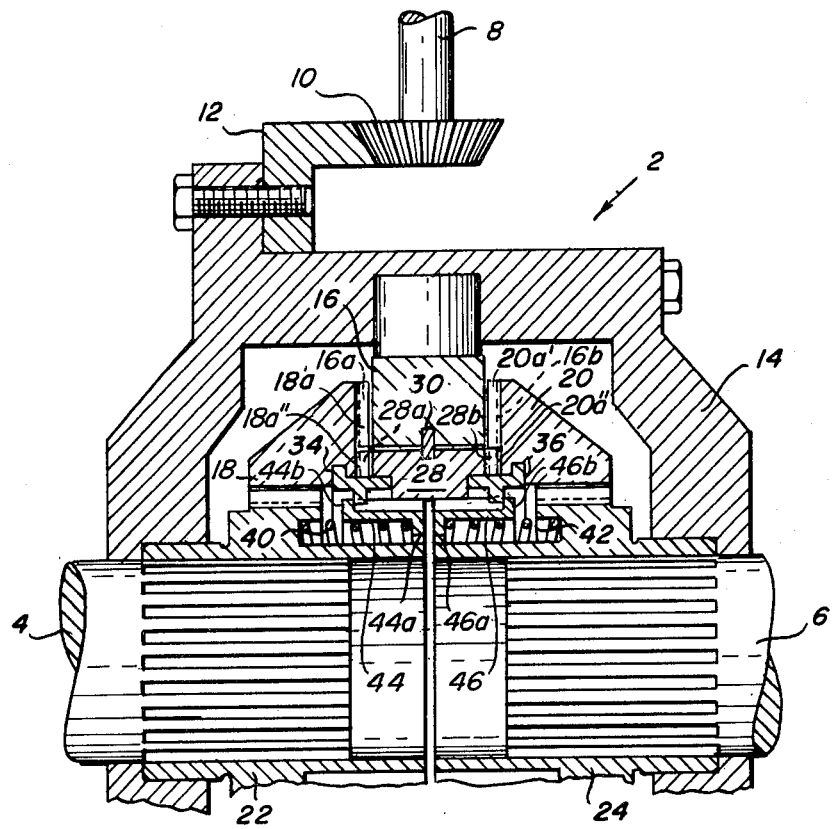
FIG. 1 is a longitudinal sectional view of the differential apparatus of the present invention.
Figure 2:
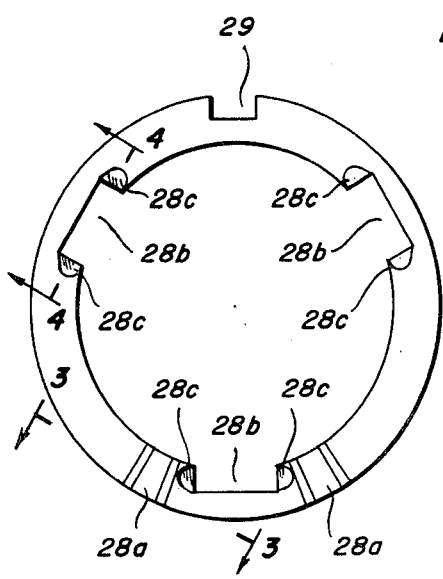
FIG. 2 is an elevational end view of the center cam member of FIG. 1.
Figure 6:
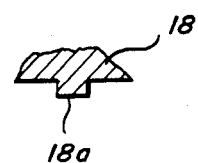
FIG. 6 is a sectional view taken along line 6—6 of FIG. 5.
Figure 7:
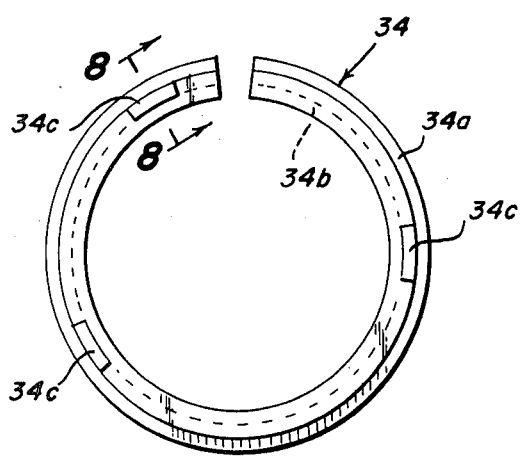
FIG. 7 is an end view of one of the holdout rings of FIG. 1.
Figure 8:
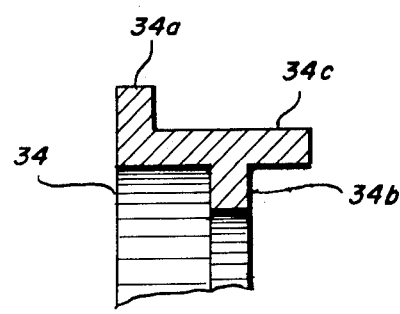
FIG. 8 is a sectional view taken along line 8—8 of FIG. 7.

Referring more particularly to FIG. 1, the differential apparatus 2 of the present invention is operable to drive a pair of output or driven shafts 4 and 6 from an input or driving shaft 8 via conical drive gear 10, ring gear 12, sectional casing 14, an annular driving member 16 non-rotatably mounted within the casing 14, and a pair of driven clutch members 18 and 20 that are splined for axial displacement on side gears 22 and 24 that are non-rotatably connected with the output shafts 4 and 6, respectively. Mounted concentrically within the spider driving member 16 is a center cam member 28 that is retained against relative axial displacement by the resilient split snap ring 30. The driven clutch member 18 has teeth 18a having the cross-sectional configuraton shown in FIG. 6, which teeth correspond in number and cross-sectional configuration to corresponding teeth 16a on the spider drive member 16. Similarly, the driven clutch member 20 has clutch teeth of similar configuration for engagement with corresponding teeth 16b on the adjacent face of the spider driving member 16 the spider teeth 16a, 16b engage corresponding radially outwardly arranged first portions 18a', 20a' of the teeth of the clutch members 18 and 20, respectively. Splines 18b on the axially displaceable clutch member 18 engage corresponding splines on the side gear 22, and a similar splined connection is afforded between clutch member 20 and side gear 24.

Figure 3:
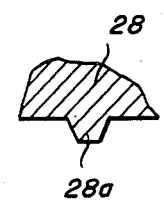
FIGS. 3 and 4 are sectional views taken along lines 3—3 and 4—4, respectively, of FIG. 2.
Figure 4:
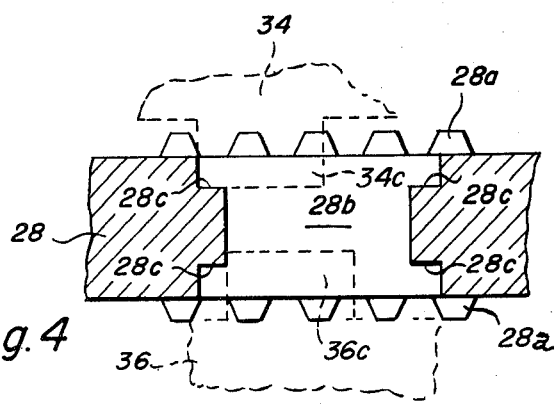
Figure 5:
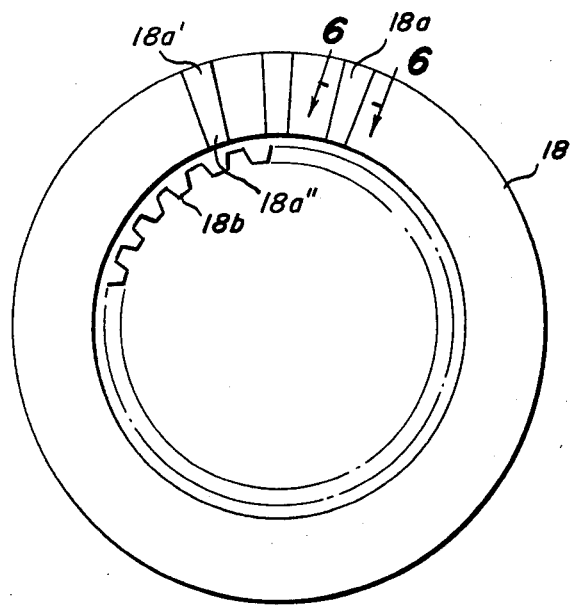
FIG. 5 is an end view of one of the side gears of FIG. 1.

In accordance with the present invention, a pair of split resilient holdout rings 34 and 36 are mounted concentrically within the driven clutch members 18 and 20, respectively, each holdout ring being resiliently radially outwardly biased into frictional engagement with the corresponding driven clutch member. The holdout ring 34 includes a radially outwardly directed annular flange portion 34a that is received in a continuous groove contained in the inner circumferential surface of the driven clutch member 18, whereby the holdout ring is rotatably connected with the clutch member 18 but is retained against axial displacement relative thereto. The holdout ring 34 also includes a radially inwardly directed annular flange portion 34b, and a plurality of circumferentially spaced lug portions 34c that extend axially within corresponding through slots 28b contained in the inner peripheral surface of the center cam member 28. The other holdout ring 36 is similarly provided with radially outwardly and inwardly directed flange portions, and with lug portions 36c that extend axially within the other ends of the through slots 28b contained in the central cam member. As shown in FIG. 4, the slots 28b have a stepped cross-sectional configuration defining shoulders 28c. The center cam member 28 has at each end teeth 28a that normally engage radially inwardly arranged second portions 18a", 20a" of the teeth of the driven clutch members 18 and 20, respectively. As shown in FIG. 3, the center cam teeth 28a have a different cross-sectional configuration than those of the driven clutch members, thereby to effect disengagement of the driven clutch member associated with an overrunning output shaft, as will be discussed in greater detail below. Through slot 29 contained in the outer periphery of the center cam member affords an access opening for expanding the snap ring 30 during disassembly of the apparatus of FIG. 1.

The driven clutch members 18 and 20 are normally biased inwardly toward teeth-enmeshing engagement with the spider driving member 16 by compression springs 40 and 42 that are concentrically arranged about the adjacent ends of the side gears 22 and 24, respectively. At their remote ends, the springs engage fixed shoulders on the associated side gears, and at their adjacent ends, the springs transmit the desired inwardly directed biasing force of the driven clutch members 18 and 20 via the annular spring retainer members 44 and 46 and the holdout rings 34 and 36, respectively. More particularly, the adjacent ends of the spring retainers have radially inwardly directed annular flange portions 44a, 46a that are engaged by the springs, and at their other ends, the retainers are provided with radially outwardly directed flanges 44b, 46b that are engaged by the inwardly directed flange portions 34b, 36b of the holdout rings, respectively.

OPERATION

In operation, as long as the output shafts 4 and 6 are driven at the same rotational velocity, driving torque is transmitted from input drive shaft 8 to the output driven shafts 4 and 6 via pinion 10, ring gear 12, casing 14, spider driving member 16, driven clutch members 18 and 20, and side gears 22 and 24, respectively. The holdout rings 34 and 36 are now in inoperable positions in which the lugs thereon extend axially within the central portions of the through slots 28b contained in the center cam member. The first (18a', 20a') and second (18a", 20a") portions of the teeth on the driven clutch members 18 and 20 are in enmeshing engagement with the corresponding teeth on the spider member 16 and the center cam member 28, respectively.

Assume now that the left hand shaft 4 overruns the right hand shaft 6. Owing to the configuration of the left hand teeth 28a of the center cam member relative to the configuration of the teeth of the left hand driven clutch member 18, the driven clutch member 18 is progressively shifted to the left relative to side gear 22 against the biasing force of spring 40, thereby to effect disengagement between the driving teeth of spider member 16 and the teeth of driven member 18. This disengagement of the driven clutch member 18 may be accompanied by a slight rotational displacement of the center cam member 28. Upon disengagement of the driven clutch member 18, relative rotational displacement between spider member 16 and driven clutch member 18 causes holdout ring 34 (which is in frictional engagement with driven clutch member 18) to be rotationally displaced to the operative position illustrated in phantom in FIG. 4, whereupon the free extremity of the lug portion 34c is seated upon the shoulder surface 28c of the slot 28b contained in the center cam member, thereby retaining the clutch member 18 in a disengaged chatter-free condition.

When the speed of the overrunning shaft 4 is returned to that of the other output shaft 6, the holdout ring is frictionally displaced to the inoperable position relative to the slots contained in the center cam member, whereupon driven clutch member 18 is shifted to the right into teeth enmeshing engagement with the driving spider member 16.

The right hand holdout ring 36 would operate in a similar fashion in the event that the right hand output shaft 6 achieves an overrunning condition.

While in accordance with the provisions of the Patent Statutes the preferred form and embodiment of the invention has been illustrated and described, it will be apparent that other changes and modifications may be made without deviating from the invention set forth above.

What is claimed is:

1. In a differential mechanism including an annular spider member (16) adapted to be rotatably driven by an input shaft (8); a pair of annular driven clutch members (18, 20) arranged coaxially with and on opposite sides of said spider member, respectively; a pair of coaxially arranged side gears (22, 24) concentrically arranged within said clutch members, respectively, said clutch members being non-rotatably connected with the associated side gears for axial displacement relative to said spider member, respectively, said side gears being adapted for non-rotatable concentric connection with the adjacent ends of a pair of output shafts (4, 6), respectively; spring means (40, 42) normally biasing said clutch members axially together toward clutch-engaged positions relative to said spider driving member; means including an annular center cam member (28) rotatably mounted concentrically within, and retained against axial displacement relative to, said spider member, said central cam member being operable when one of said side gears overruns the other to displace the clutch member associated with the overrunning side gear axially away from said spider member toward a disengaged position relative thereto; and holdout ring means for maintaining said assoiated driven clutch member in the disengaged condition as long as said one side gear overruns the other side gear; the improvement wherein (1) said holdout ring means comprise (a) a pair of generally annular split resilient holdout rings (34, 36) arranged concentrically within said driven clutch members, respectively;

(b) said holdout rings being resiliently biased radially outwardly into frictional engagement with corresponding inner circumferential surfaces of said driven clutch members, respectively;

(c) said holdout rings having at their remote ends outer radially extending annular flange portions (34a, 36a) extending radially within corresponding inwardly extending radial grooves contained in the inner circumferential surfaces of said driven clutch members, respectively, whereby each of said holdout rings is connected for rotational movement with, and is retained against axial displacement relative to, the associated driven clutch member, respectively;

(d) said holdout rings including at their adjacent ends radially inwardly directed annular flange portions (34b, 36b), respectively, and a plurality of circumferentially spaced holdout lugs (34c, 36c) that extend axially within corresponding slots (28b), contained in the adjacent ends of said center cam member, respectively, said slots having in longitudinal cross-section a configuration defining holdout shoulders (28c), said lugs being so dimensioned and having such a configuration that when one of the side gears is in an overrunning condition, the associated holdout ring is slightly axially and rotationally displaced relative to the central cam member from an inoperable central position relative to the associated slot to an operable holdout position on one of said shoulders in which the associated driven clutch member is maintained disengaged from said spider driving member;

(2) wherein said spring means comprises (a) a pair of aligned compression springs (40, 42) arranged concentrically within said holdout rings for reaction at their remote ends with the associated side gears, respectively; and (b) spring retainer means for transmitting the biasing force reactions at the adjacent ends of said springs to said holdout rings, respectively, said spring retainer means including a pair of aligned spring retainer rings (44, 46) arranged concentrically within said holdout rings, respectively, said retainer rings including at their remote ends radially outwardly extending flange portions (44b, 46b) in engagement with the inwardly directed flange portions of said holdout rings, respectively, said retainer rings including at their adjacent ends radially inwardly directed flange portions (44a, 46a) that are engaged by the adjacent ends of said compression springs, respectively;

(3) and further wherein each of said driven clutch members includes one set of driven teeth (18a, 20a) of continuous uniform configuration, said spider member having driving teeth (16a, 16b) of the same configuration as, and in enmeshing engagement with, first portions (18a', 20a') of said driven clutch member teeth, and said center cam member having at opposite ends overrunning clutch disengaging teeth (28a) in enmeshing engagement with second portions (18a", 20a") of the teeth of said driven clutch members, respectively.

2. Apparatus as defined in claim 1, wherein each of the slots contained in said center cam member comprises a through slot (28b) each of the opposed side walls of which is stepped to define a pair of recessed holdout shoulders (28c).

* * * * *